United States Patent
Tsai (10) Patent No.: US 9,485,407 B2
(45) Date of Patent: Nov. 1, 2016

(54) METHOD OF CAPTURING IMAGES AND OBTAINING INFORMATION OF THE IMAGES

(71) Applicant: LUSTROUS ELECTRO-OPTIC CO., LTD., New Taipei (TW)

(72) Inventor: Chih-Wei Tsai, Hsinchu (TW)

(73) Assignee: LUSTROUS ELECTRO-OPTIC CO., LTD., New Taipei (TW)

( * ) Notice: Subject to any disclaimer, the term of this patent is extended or adjusted under 35 U.S.C. 154(b) by 0 days.

(21) Appl. No.: 14/585,373

(22) Filed: Dec. 30, 2014

(65) Prior Publication Data

US 2015/0301431 A1    Oct. 22, 2015

(30) Foreign Application Priority Data

Apr. 21, 2014  (TW) .............. 103114408 A (51) Int. Cl.
| | |
|---|---|
| *H04N 5/232* | (2006.01) |
| *G02B 7/36* | (2006.01) |
| *G02B 13/14* | (2006.01) |
| *G02B 27/00* | (2006.01) |
| *G03B 35/06* | (2006.01) |

(52) U.S. Cl.
CPC ............ *H04N 5/23212* (2013.01); *G02B 7/36* (2013.01); *G02B 13/14* (2013.01); *G03B 35/06* (2013.01); *G02B 27/0075* (2013.01); *G03B 2205/0092* (2013.01)

(58) Field of Classification Search
CPC ...... H04N 5/23212; H04N 3/04; H04N 3/06; G03B 35/06; G03B 2205/0092; G02B 13/14; G02B 7/36; G02B 27/0075
USPC ........................................... 349/345
See application file for complete search history.

(56) References Cited

U.S. PATENT DOCUMENTS

| | | | |
|---|---|---|---|
| 2012/0257068 A1* | 10/2012 | Imai ................. | H04N 5/23212 348/207.11 |
| 2012/0261474 A1* | 10/2012 | Kawashime ............ | G02B 3/14 235/462.24 |
| 2013/0010067 A1* | 1/2013 | Veeraraghavan .... | H04N 5/2226 348/46 |
| 2013/0088637 A1* | 4/2013 | Duparre ............ | H04N 5/23212 348/360 |

* cited by examiner

*Primary Examiner* — Gevell Selby
(74) *Attorney, Agent, or Firm* — Li & Cai Intellectual Property (USA) Office (57) ABSTRACT

A method of capturing images includes the following steps of: providing a camera module including an image capture unit, a liquid lens unit, and an image process unit; capturing a clear image through the camera module; enlarging the camera's relative aperture to create a shallow depth-of-field; adjusting the focal plane of the liquid lens unit to analyze object depth information in the clear image; and adding or storing the depth information of the object to the clear image.

6 Claims, 5 Drawing Sheets

```
                                                          ┌─ S300
      provide a camera module having large aperture and narrow depth of field
                                      │
                                      ▼
     modulate to different focal distances with a liquid
     lens unit and capture a plurality of clear subsequent  ─ S302
     images corresponding to the different focal distances
                                      │
                                      ▼
     Determine whether an object is clear in the plurality
        of captured images by the image processing unit     ─ S304
     and analyze distance information of the clear object
                                      │
                                      ▼
        overlay the images with the clear object to
      form a clear image having deep depth of field         ─ S306
       and distance information of the clear object
```

METHOD OF CAPTURING IMAGES AND OBTAINING INFORMATION OF THE IMAGES

BACKGROUND OF THE INVENTION

1. Field of the Invention

The instant disclosure relates to a method for capturing images; in particular, to a method for capturing images and obtaining object depth information in the images or photos.

2. Description of Related Art

Images obtained through conventional camera typically convert three dimensional scenes into two dimensional planes, and the naked eye can easily determine whether objects in the images are far or near based on past experience, and deduce the dimensions of other objects and the approximate distances from which the known objects are located based on the dimensions of the known objects. However, to directly determine the depth or relative distance between objects in the image is a quite a hurdle.

Typically for devices or software, additional devices such as laser rangefinder, infrared rangefinder, radar, acoustic, ultrasonic, etc are needed for auxiliary detection. However, laser or infrared rangefinders are limited to detect depth information by a single point or to a certain region, while the radar, acoustics, or supersonic, which are required to use a mechanical scanner in order to cover the entire area, have relatively poorer resolution.

Time-of-flight (ToF) camera are developed to overcome the single point or regional limitations, however, since the Time-of-flight camera detects object depth by measuring the time required for a specific signal light source (i.e. infrared beam) to reflect from the object back to the camera, if the ToF camera is applied outdoors, the light source is adversely affected by the ambient light source, such as sun rays, thus, leading to inaccurate testing results.

Moreover, although additional information can be used to calculate the object depth (the relative distance between the camera and the objects), i.e. to simulate the structure of the human eyes, the relative distance between two cameras can be used to calculate the object depth, however, the existing technology requires two or more cameras and the relative distances between those cameras must be accurately fixed, thus, making the image processing relatively complex. Thus, it is necessary to provide a method to detect object depth in image signals or photos while simultaneously provide accurate information.

To address the above issues, the inventor strives via associated experience and research to present the instant disclosure, which can effectively improve the limitation described above.

SUMMARY OF THE INVENTION

The objective of the instant disclosure is to provide a method for capturing images which can obtain depth information of objects in photo.

In order to achieve the aforementioned objectives, according to an embodiment of the instant disclosure, a method for capturing images is provided. The method includes the following steps: providing a camera module. The camera module includes an image capture unit, a liquid lens unit, and an image processing unit; capturing a clear image with the camera module at the beginning; enlarging the camera's relative aperture to create a shallow depth-of-field characteristic and then capturing a plurality of subsequent images by adjusting camera's focal-plane with a liquid lens unit; analyzing object depth information in each image of the subsequent images with an image processing unit; and adding the calculated object depth information into the original clear image.

In order to achieve the aforementioned objectives, according to another embodiment of the instant disclosure, the method for capturing images is provided. The method includes the following steps: providing a camera module having narrow depth of field characteristic created by a large aperture. The camera module includes an image capture unit, a liquid lens unit, and an image processing unit; capturing a plurality of subsequent images corresponding to different focus distances of the camera module with the liquid lens unit; determining whether an object is clear in the plurality of captured subsequent images by the image processing unit and analyzing depth information of the clear object; and overlaying the subsequent images with the clear object to form a clear photo having object depth information.

In order to achieve the aforementioned objectives, according to another embodiment of the instant disclosure, the method for capturing images is provided. The method includes the following steps: capturing a clear image with the camera module; enlarging the camera's relative aperture to create a shallow depth-of-field characteristic and then capturing a plurality of subsequent images by adjusting the focus distance of the camera module with the liquid lens unit; analyzing object depth information in each image of the subsequent mages with an image processing unit; and adding the calculated object depth information into the original clear image.

The instant disclosure provides the following improvements. The method for capturing images in accordance with the embodiments of the instant disclosure can adjust focus distance of the camera module with the liquid lens unit and analyzes depth information of an object via the image capture unit and the image process unit, so that additional detection devices or camera are not necessary and the processing load due to the analysis of depth information of the object in the image is reduced. With the swift focal-plane scanning of the camera module, object depth information is quickly and easily obtained. Moreover, the method of the instant disclosure is not affect by the environment as long as clear imaging is available for computation. The method also provides comprehensive depth information without being limited to a single point or limited regional depth information of an object. Furthermore, the instant disclosure can also be applied to radar on a vehicle or a three-dimensional information extractor that is suitable for short distance detection.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

First Embodiment

Please refer to FIGS. 1, 2, 5A, and 5B. The instant embodiment provides a method for capturing images, including the following steps. Step S200 provides a camera module 1, which includes an image capture unit 11, a liquid lens unit 12, and an image process unit 13, and a control module 2 can be further included. The control module 2 is electrically connected to and controls the image capture unit 11, the liquid lens unit 12, and the image process unit 13.

Figure 1:
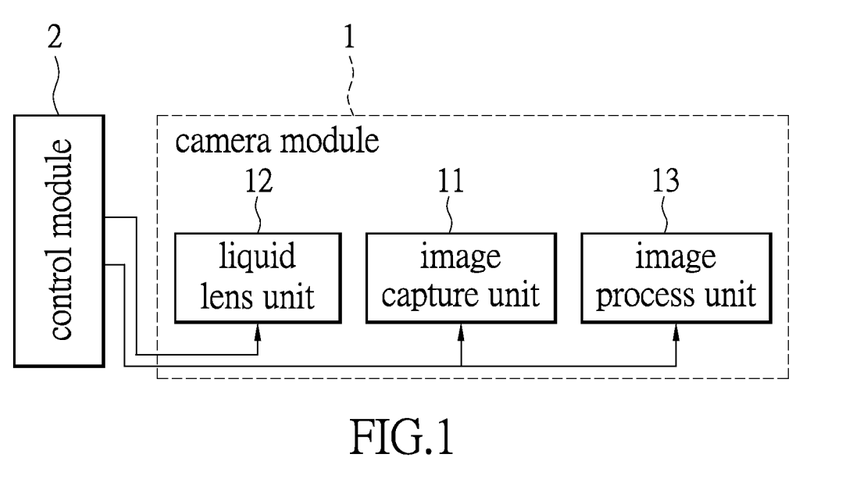
FIG. 1 is a block diagram of a method for capturing images in accordance with the instant disclosure.
Figure 2:
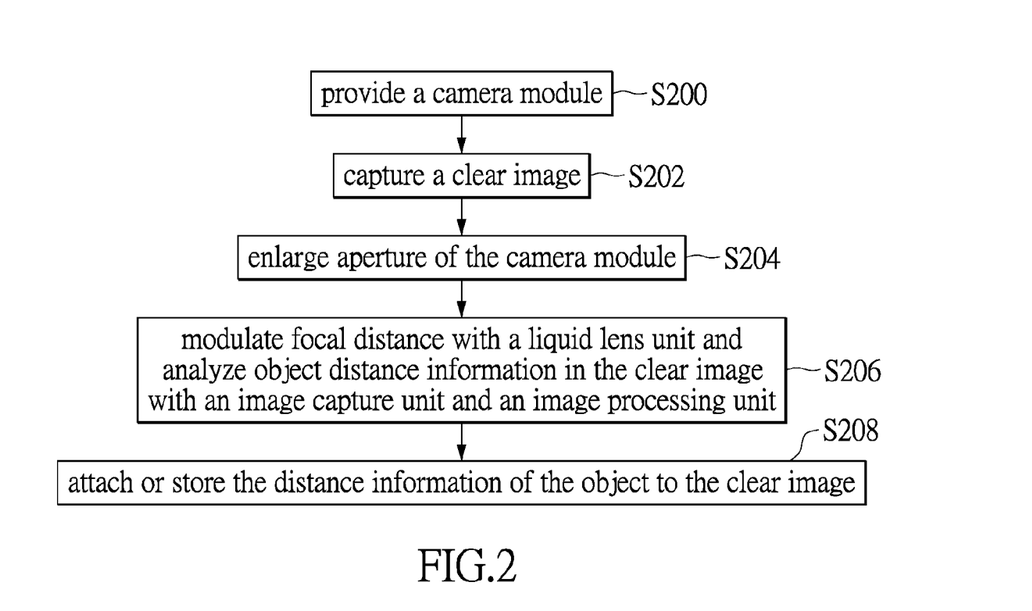
FIG. 2 is a flow diagram of the method for capturing images in accordance with a first embodiment of the instant disclosure.

In step S202, capture a clear image I with the camera module 1 at a preset aperture. For example, the preset aperture is the relative aperture when the camera module 1 is auto-focusing. The preset aperture can determine the amount of aperture adjustment is necessary when using the internal system of the camera module 1, so that multiple objects in the clear image captured are clearly presented. In other words, the aperture and shutter are linked values when capturing images. The camera module 1 will automatically detect the light in the environment and adjust the best exposure time and relative aperture according to the intensity of the ambient light in the environment. If the aperture is fixed on the camera module 1, the exposure time is automatically adjusted to provide clear imaging.

In step 204, after a clear image I is captured under a preset aperture, the aperture of the camera module 1 is enlarged or adjusted to a preset value in order to obtain narrow depth of field caused by large aperture. According to the equation of depth of field (DOF), $DOF \approx (2Ncf^2s^2)/(f^4 - N^2c^2s^2)$, in which DOF is depth of field, N is the relative aperture of the camera lens, c is a diameter of the circle of confusion for a specific format of the film, f is effective focal length of the camera lens, s is a distance (object distance) between the camera and a focal point. Notably, for a specific film format, factors to be considered for the determination of depth of field are effective focal length of the camera lens, relative aperture and object distance. As a result, when executing step S204 or when the clear image is captured with the camera module 1 adjusted to the maximum available setting, the depth of field is the shallowest. Typical relative aperture are 1.4, 2, 2.8, 4, 5.6, 8, 11, 16, 22, and 32, in which larger the aperture, the smaller the relative aperture. The control module can adjust the relative aperture to about 2, 1.4 or even smaller in order to provide camera module 1 with narrow depth of field, which facilitates subsequent calculations of object depth distance. Please refer to FIG. 4 as a schematic diagram illustrating the focal-plane scanning principle. The vertical axis represents the focal plane of the camera module, while the horizontal axis represents the depth of field at this focal plane. Typically, the closer a focal plane is to the image capture unit 11, the shallower the depth of field. The liquid lens unit 12 of the instant disclosure applies focal-plane scanning, which includes capturing a plurality of images in the scanning range to obtain images at different focal planes. With the appropriate focal-plane scanning by the liquid lens unit 12, the subsequently captured images at different focal planes cover the preferred set distance for image capturing. For example, a depth of field at a focus distance (distance between focal plane and camera module) of 2 meters is defined as depth of field R1, a second depth of field at a focal length of 2.5 meters is defined as depth of field R2, a third depth of field at a focus distance of 3.5 meters is defined as depth of field R3, and a fourth depth of field at a focus distance of 5 meters is defined as depth of field R4. Due to the short focal-plane adjustment time (at <10 ms class), image scanning can be swiftly accomplished.

Moreover, in step S206, the image capture unit 11 and the image process unit 13 analyze and calculate the depth information of each object in the clear image I by applying the focal-plane scanning principle. For example, the image capture unit 11, via the control of the control module 2, can subsequently capture a plurality images at different focal planes in a short period of time, while the image process unit 13, via the control of the control module 2, analyzes the series of image groups or subsequent photos at different focal planes that are captured by the image capture unit 11 and obtains each object depth information from the clear image I.

The control module 2 of the instant disclosure can control operation mode of the camera module 1 to an area scanning mode in order to have the liquid lens unit 12 quickly perform focal-plane scanning. In step S206, the image capture unit 11 and the image process unit 13, via focal-plane scanning by the liquid lens unit 12, capture multiple subsequent images or photos respectively corresponding to different focal planes of the camera module 1, and simultaneously analyze the multiple subsequent images or photos respectively corresponding to the focal planes of the camera module 1 in order to analyze and calculate each object depth information in the clear image I.

Figure 5A:
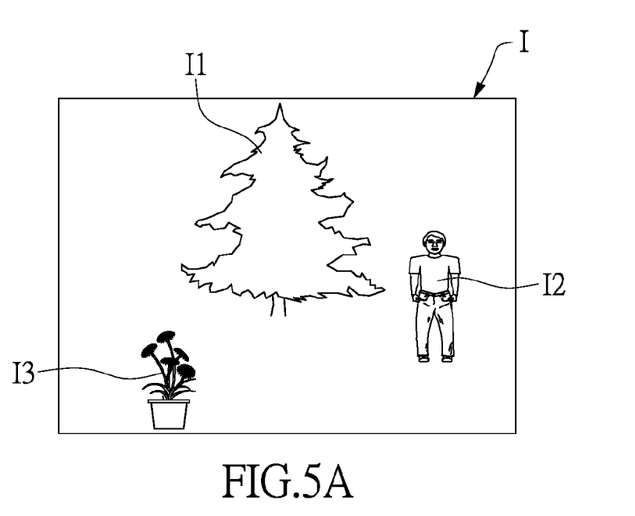
FIG. 5A is a schematic diagram illustrating the capturing of one clear image in the method for capturing images in accordance with the first embodiment of the instant disclosure.
Figure 5B:
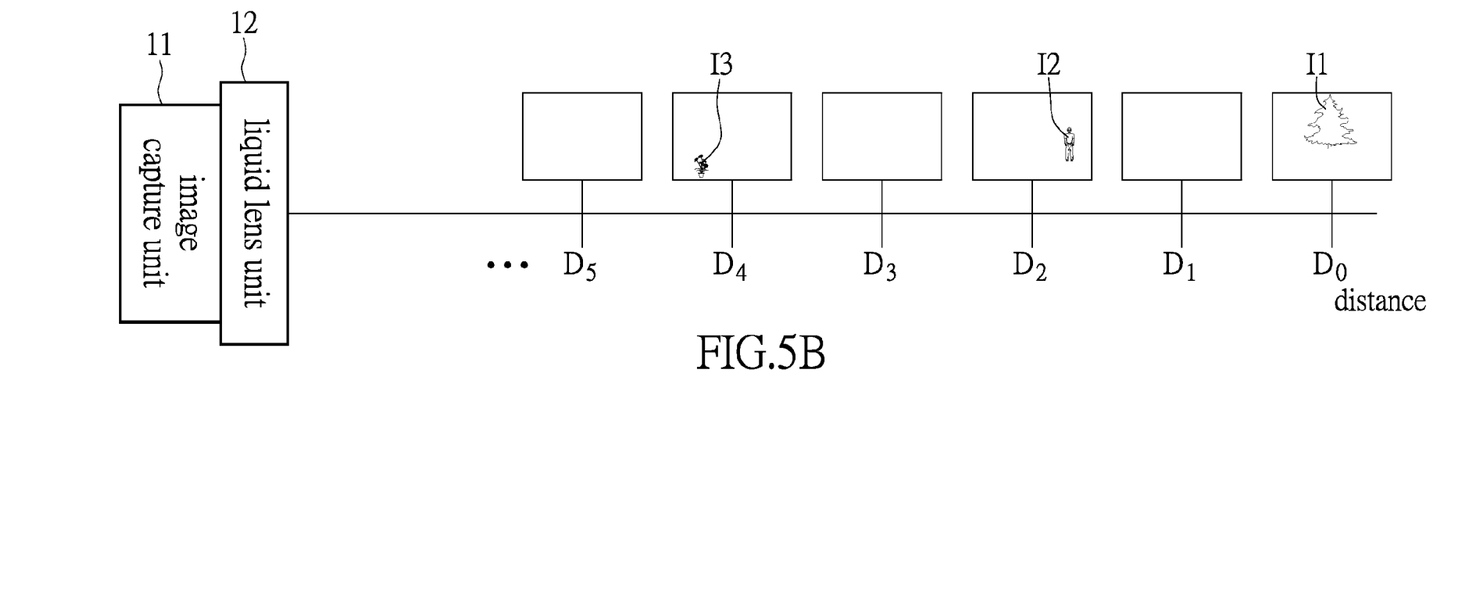
FIG. 5B is a schematic diagram illustrating the focal-plane scanning in a scanning region in the method for capturing images in accordance with the first embodiment of the instant disclosure.

Please refer to FIG. 5A. Specifically for the first embodiment, the clear image I has a tree I1, a human target I2, and a flower I3, in which the objects are spaced apart by different distances. Please refer to FIG. 5B as the schematic diagram illustrating the focal-plane scanning in a scanning range in accordance with the first embodiment of the instant disclosure. When the liquid lens unit 12 is controlled by the control module 2 to adjust focal plane, the scanning begins from a far distance, a focus distance $D_0$ of a first focal plane, to a close distance, a focus distance $D_5$ of a sixth focal plane, as shown in FIG. 5B. The image capture unit 11 captures a plurality of images at different focal planes when the liquid lens unit 12 is activated, and when the object is located in the DOF range of one focal plane, a clear portion will appear in the captured image at this focal plane, and the location at which the clear portion appears confirms that the object depth is the distance of this focal plane.

Notably, captured images can be analyzed by the image process unit 13 to determine whether the focus is correct while retaining the clear portion. For example, image contrast and sharpness values can be calculated by applying the concept of lens resolution and the modulation transfer method (MTF) as the image sharpness algorithm, while matching the adjusted focal length of the liquid lens unit 12, via the image process unit 13, and analyzing the object distance in the clear portion. Alternatively, other sharpness algorithm can be used to determine whether or not the captured images are focused correctly while retaining the clear portion. With the focus distance of the camera module 1 known and the determination of contrast and sharpness at the known focus distance for the image captured by the image process unit 13, correct focus for the object can be realized under the known focus distance. If contrast and sharpness is determined to have correctly focused on the object, the adjusted focus distance of the camera module 1 is the object depth. Notably, in order to reduce the analytical processing load of the image process unit 13, pixels of the captured image can be reduced to enhance analytical processing efficiency.

In other words, if the edge of an image has significant changes in one of the captured subsequent images at different focal planes by the image capture unit 11, the larger the difference between the greyscale values or gradient values of the adjacent pixels, the clearer the captured image. With such characteristics, the subsequent photos or images captured by the image capture unit 12, via processing by the image processing unit 13, can obtain sharpness related value information for determination criteria. Furthermore, blurriness that appears in images may due to insufficient high frequency signal in the image, and relatively more low frequency energy. After the high frequency information of image is obtained via frequency domain filtering method of a high-pass filter, the high frequency information of image can be used as a basis for judgment.

By determining the clear portion as mentioned above, object depth information located in the clear portion can be used to calculate multiple depth information of multiple objects in a clear image I initially captured. Notably, the image capture unit 11 and the image process unit 13, via the focal-plane scanning by the liquid lens unit 12 and during the calculation of the depth information of each object in the clear image I, can change the aperture of the camera module 1 according to the focal-plane scanning by the liquid lens unit 12. In other words, the aperture of the camera unit 1 can be floating when the image capture unit 11 is in the process of capturing images in order to comply with the appropriate relative aperture under a specific focal length via adjustments of the focal length or setting a preset value after the determination of the object depth information.

For example, when the focus distance of the camera module 1 is adjusted to the focus distance $D_0$ of the first focal plane by the liquid lens unit 12, the image capture unit 11 first captures the image with that specific focus distance, and then the image process unit 13 determines whether the focus distance has a correctly focused first clear portion. If a clear portion exists, the image process unit 13 analyzes the object depth information in the first clear portion of the clear image I. When adjusted to a focus distance $D_1$ of the second focal plane, the image capture unit 11 first captures the image with that specific focus distance, and then the image process unit 13 determines whether the focus distance has a correctly focused second clear portion. If the second clear portion exists, the image process unit 13 analyzes the object depth information in the second clear portion of the clear image I. When adjusted to a focus distance $D_2$ of the third focal plane, the image capture unit 11 first captures the image with that specific focus distance, and then the image process unit 13 determines whether the focus distance has a correctly focused third clear portion. If the third clear portion exists, the image process unit 13 analyzes the object depth information in the third clear portion of the clear image I. When adjusted to a focus distance $D_3$ of a fourth focal plane, the image capture unit 11 first captures the image with that specific focus distance, and then the image process unit 13 determines whether the focal length has a correctly focused fourth clear portion. If the fourth clear portion exists, the image process unit 13 analyzes the object depth information in the fourth clear portion of the clear image I. When adjusted to a focus distance $D_4$ of a fifth focal plane, the image capture unit 11 first captures the image with that specific focus distance, and then the image process unit 13 determines whether the focal length has a correctly focused fifth clear portion. If the fifth clear portion exists, the image process unit 13 analyzes the object depth information in the fifth clear portion of the clear image I. When adjusted to the focus distance $D_5$ of the sixth focal plane, the image capture unit 11 first captures the image with that specific focus distance, and then the image process unit 13 determines whether the focus distance has a correctly focused sixth clear portion. If the sixth clear portion exists, the image process unit 13 analyzes the object depth information in the sixth clear portion of the clear image I. The image capture unit 11, via focal-plane scanning by the liquid lens unit 12, can capture multiple subsequent images that respectively correspond to the different focal lengths of the liquid lens unit 12, while the image process unit 13 simultaneously analyzes the way object depth information in each successive image is calculated. Alternatively, the image capture unit 11 can first capture a series of image groups or subsequent photos with narrow depth of field and different focus distances, then the image process unit 13 can analyze and compute a plurality of images or subsequent photos with narrow depth of field and different focus distances to obtain the object depth information of the clear portions in a plurality of images or subsequent photos with narrow depth of field and different focus distances.

As shown in FIG. 5B, when the liquid lens unit 12 adjusts to the focus distance $D_0$ of the first focal plane, via the determination of the image process unit 13, the tree I1 in the clear image I is considered to be clear under the current focus distance, thus, the depth information of tree I1 in the clear region is defined as the focus distance. When adjusted to the focus distance $D_1$ of the second focal plane, via the determination of the image process unit 13, no clear object exists in the current focus distance, thus, no usable depth information is available. When adjusted to the focus distance $D_2$ of the third focal plane, via the determination of the image process unit 13, the human target I2 in the clear image I is considered to be clear under the current focus distance, thus, the depth information of human I2 in the clear region is defined as the focus distance. When adjusted to the focus distance $D_3$ of the fourth focal plane, via the determination of the image process unit 13, no clear object exists in the current focus distance, thus, no usable depth information is available. When adjusted to the focus distance $D_4$ of the fifth focal plane, via the determination of the image process unit 13, the flower I3 in the clear image I is considered to be clear under the current focus distance, thus, the depth information of flower I3 in the clear region is defined as the focus distance. When adjusted to the focus distance $D_5$ of the sixth focal plane, via the determination of the image process unit 13, no clear object exists in the current focus distance, thus, no usable depth information is available.

Figure 5C:
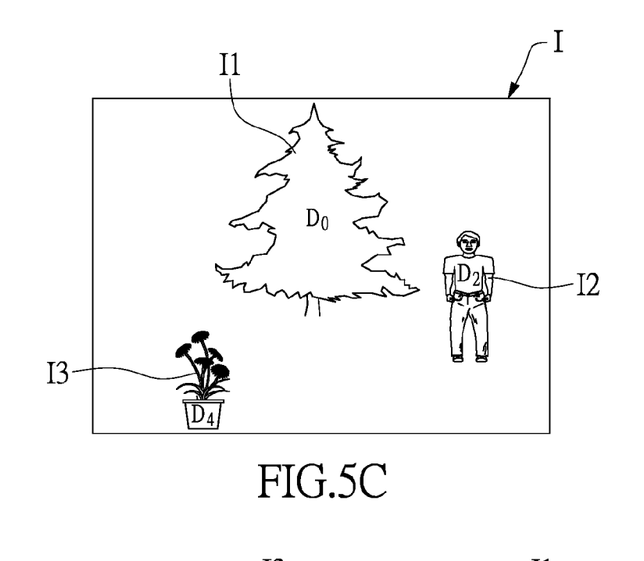
FIG. 5C is a schematic diagram illustrating an image or display having depth information in the method for capturing images in accordance with the first embodiment of the instant disclosure.

As shown in step S208, adding or storing object depth information to the clear image I. For example, the object depth information can be marked to the clear image I or stored in the file of the clear image I to serve as a basis for successive image processing. For example, multiple object depth information along with the clear images I can be overlaid to form an image or picture having multiple object depth information via the control of the image process unit 13 or a signal module by the control module 2. Consequently, continuously playback can form an image with all the object distance labeled on the screen. Specifically in the instant embodiment, the object depth information of the tree I1, human I2, and the flower I3 in the clear image I, after overlaid, can be combined to obtain a distance value of the tree I1, human I2, and flower I3 in the clear image I. As shown in FIG. 5C, the tree I1 in the clear image I after overlaid can have the distance value of the focus distance $D_0$ of the first focal plane, the human I2 in the clear image I can have the distance value of the focus distance $D_2$ of the third focal plane, and the flower I3 in the clear image I can have the distance value of the focus distance $D_4$ of the fifth focal plane. Specifically, the focus distance change of the camera module 1 by the adjusted focal length of the liquid lens unit 12 is to scan within a scanning region, and is not limited to scan from far to near or near to far, but the focus distance of the camera module 1 by the adjusted focal length of the liquid lens unit 12 can also be scanned from near to far as well.

In the instant disclosure, more accurate object depth information can be captured by refining the focus distance of camera module 1 adjusted by the liquid lens unit 12. The finer the object depth information is obtained, the more accurate the object depth information of the image or photo is formed. For example, when rough object depth information is obtained from rough adjustment, the differences will be relatively larger in value in terms of the determination of the object depth information. The object depth from the camera module 1 can only be determined if the object is within 5 to 10 meters of the camera 1. However, after fine tuning of the adjustment, finer and more accurate object depth information can be obtained, for example the distance between the object and the camera module to be about 7 to 8 meters of one another can be further determined. The two types of adjustments differ in the depth of field and the variation on the focus distance adjustments of the camera module 1. Moreover, if the object depth information captured is relative little and the resolution is relatively rough, object depth can be determined by interpolation and analysis to provide finer object depth information in order to enhance resolution. By capturing less object depth information along with interpolation, computation of the image process unit 13 or signal processing module can be reduced and overlay efficiency can be enhanced. Furthermore, the image process unit 13, signal processing module, and the control module 2 can be computer or connected to a computer, so that the overlaying process and the determination of the object depth information can be computed by the computer. The image process unit 13, the signal processing module, and the control module 2 can also be embedded systems, which function similarly to a computer, can complete the overlaying process and the determination of the object depth information.

The image capture method in accordance with the first embodiment of the instant disclosure can be used on a typical camera module 1 having liquid lens unit 12, and only needs to be coordinate with the image capturing method in according with the first embodiment of the instant disclosure by adding or storing multiple depth information of multiple objects into the clear image I or directly overlaying the depth information with the clear image I to obtain an image or photo with multiple depth information of multiple objects. Before the image capturing method is executed, the camera module 1 can be used as a typical camera. In other words, the first embodiment can obtain depth information between the camera module 1 and each object in the clear image I through the following steps: providing a camera module, capturing a clear image, enlarging the camera's relative aperture to create a shallow depth-of-field characteristic, capturing a plurality of subsequent images by adjusting camera's focal-plane with the liquid lens unit, analyzing object depth information in each image of the subsequent images with an image processing unit, and adding the calculated object depth information into the original clear image Second Embodiment Please refer to FIGS. 1, 3, 6A, and 6B. The second embodiment of the instant disclosure provides an image capturing method, in which the most significant difference between the first and second embodiments is that the second embodiment can use a camera module 1 with large aperture that creates a narrow depth of field or a camera module 1 having preset relative aperture while not requiring a clear image I to be taken beforehand. As the image capture unit 11 retrieves clear regions of the image, the image process unit 13 analyzes the object depth information, and finally image and object depth information are overlaid.

Figure 3:
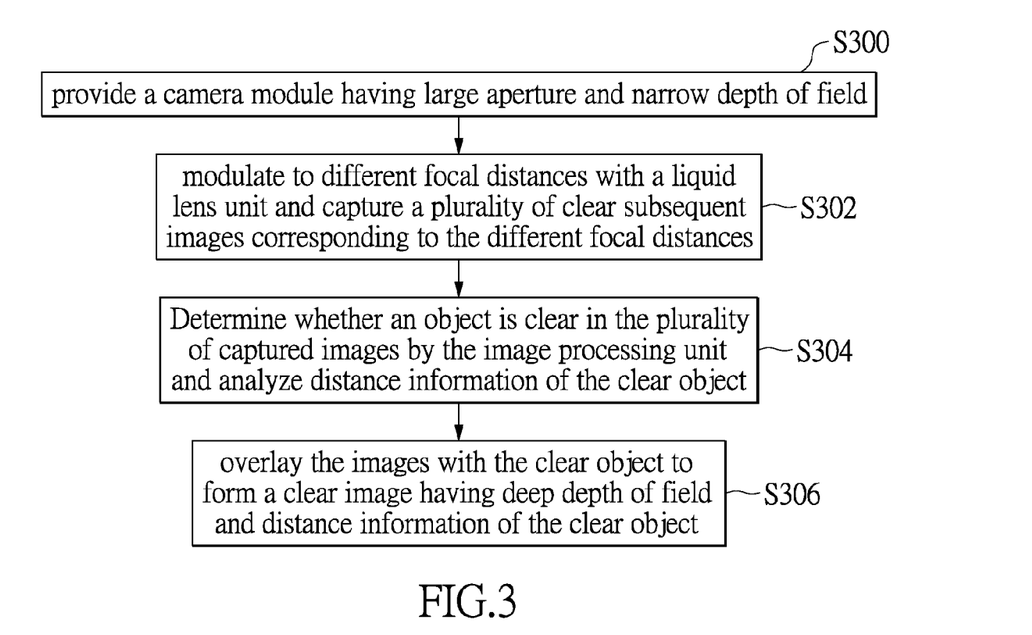
FIG. 3 is a flow diagram of the method for capturing images in accordance with a second embodiment of the instant disclosure.

As shown in FIG. 3, the second embodiment of the instant disclosure provides a method for capturing images, which includes the following steps. In step S300, providing a camera module 1 having large aperture to create a narrow depth of field. The camera module 1 includes an image capture unit 11, a liquid lens unit 12, and an image process unit 13. The control module 1 is electrically connected to and controls the image capture unit 11, the liquid lens unit 12, and the image process unit 13. The camera module 1 can be of large aperture to create a narrow depth of field. In order to achieve shallow depth of field, relative aperture of 2, 1.4, or even smaller value, which is considered to be large aperture, is applied in order to obtain relatively larger aperture and so the depth of field can be shallower or narrower.

Figure 4:
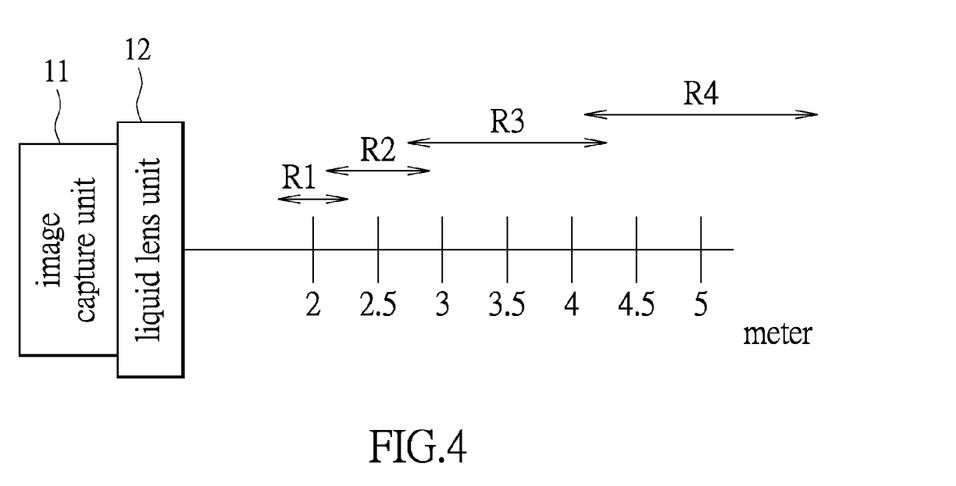
FIG. 4 is a schematic diagram illustrating focal-plane scanning principle of the method for capturing images in accordance with the instant disclosure.
Figure 6A:
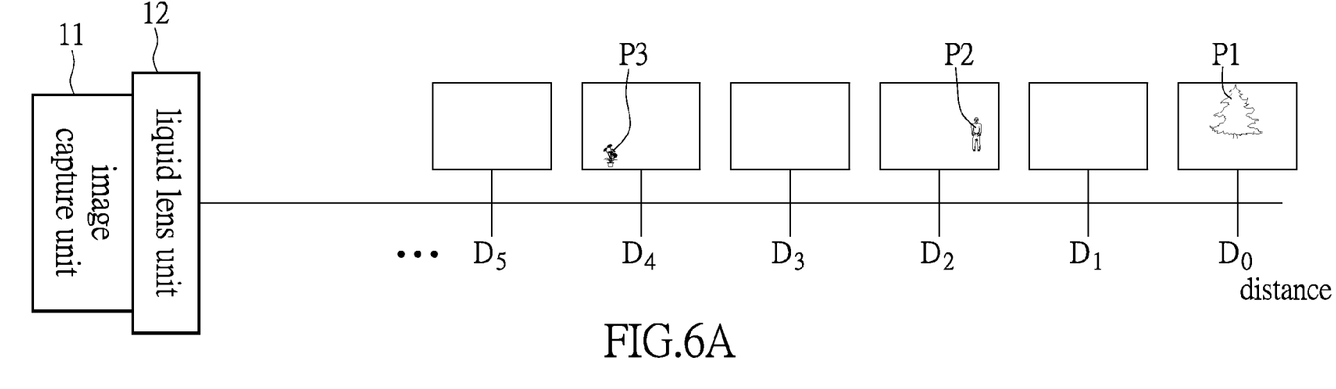
FIG. 6A is a schematic diagram illustrating the focal-plane scanning in a scanning region in the method for capturing images in accordance with the second embodiment of the instant disclosure.

Please refer to FIG. 6A along with step S302. The image capture unit 11, within a short period of time and via focal-plane scanning by the liquid lens unit 12, subsequently captures multiple image groups or photos that are respectively corresponding to the different focal lengths of the liquid lens unit 12 within the narrow depth of field. Please refer to FIG. 6A in conjunction with focal-plane scanning principle with respect to a surface as shown in FIG. 4. Step S302 is executed, in which the camera module 1, via the focal-plane scanning by the liquid lens unit 12, captures a series of image groups or photos respectively corresponding to the different focal lengths of the liquid lens unit 12 with a narrow depth of field. The image capture unit 11, for example, can be controlled by the control module 2 for image capturing.

Moreover, as shown in step S304, determining whether an object is clear in the plurality of captured images by the image processing unit 13 and analyzing the depth information of the clear object. Please refer to FIGS. 6A and 6B.

FIG. 6A is a schematic diagram illustrating the focal-plane scanning in a scanning region in accordance with the second embodiment of the instant disclosure. When the liquid lens unit 12 is controlled by the control module 2 to provide focal-plane scanning with the camera module 1. During focal-plane scanning by the camera module 1, each of the multiple images that is captured by the image capture unit 11 at different focus distance will have a clear portion different from the clear portion in another image, so when the focus distance is correct, the captured images will have a clear portion. When the captured images are blurry, meaning no object at the time corresponds to the focus distance and so the location in which the clear portion is located means that the distance of the object is correct.

When the focus distance of the camera module 1 is adjusted to the focus distance $D_0$ of the first focal plane, the image capture unit 11 first captures the images or photos at the focus distance $D_0$, the image process unit 13 determines whether the correctly focused first clear portion exists at the focus distance $D_0$. If the first clear portion exists, the image process unit 13 analyzes the object depth information of the first clear portion in the images or photos of the focus distance $D_0$. When the focus distance of the camera module 1 is adjusted to the focus distance $D_1$ of the second focal plane, with the image capture unit 11 first capturing the images or photos at the focus distance $D_1$, the image process unit 13 determines whether the correctly focused second clear portion exists at the focus distance $D_1$. If the second clear portion exists, the image process unit 13 analyzes the object depth information of the second clear portion in the images or photos of the focus distance $D_1$. When adjusting to the focus distance $D_2$ of the third focal plane, with the image capture unit 11 first capture the images or photos at the focus distance $D_2$, the image process unit 13 determines whether the correctly focused third clear portion exists at the focus distance $D_2$. If the third clear portion exists, the image process unit 13 analyzes the object depth information of the third clear portion in the images or photos of the focus distance $D_2$. When adjusting to the focus distance $D_3$ of the fourth focal plane, with the image capture unit 11 first capture the images or photos at the focus distance $D_3$, the image process unit 13 determines whether the correctly focused fourth clear portion exists at the focus distance $D_3$. If the fourth clear portion exists, the image process unit 13 analyzes the object depth information of the fourth clear portion in the images or photos of the focus distance $D_3$. When adjusting to the focus distance $D_4$ of the fifth focal plane, with the image capture unit 11 first capture the images or photos at the focus distance $D_4$, the image process unit 13 determines whether the correctly focused fifth clear portion exists at the focus distance $D_4$. If the fifth clear portion exists, the image process unit 13 analyzes the object depth information of the fifth clear portion in the images or photos of the focus distance $D_4$. When adjusting to the focus distance $D_5$ of the sixth focal plane, with the image capture unit 11 first captures the images or photos at the focus distance $D_5$, the image process unit 13 determines whether the correctly focused sixth clear portion exists at the focus distance $D_5$. If the sixth clear portion exists, the image process unit 13 analyzes the object depth information of the sixth clear portion in the images or photos of the focus distance $D_5$. Then, the object depth information processed by the image process unit 13 can be added or stored to the corresponding images or photos.

Figure 6B:
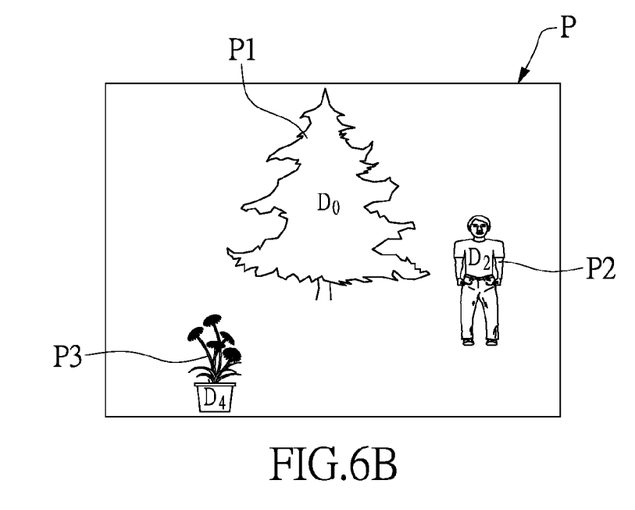
FIG. 6B is a schematic diagram illustrating one clear image having depth information in the method for capturing images in accordance with the second embodiment of the instant disclosure.

As shown in FIG. 6B, specifically for this embodiment, when the focus distance of the camera module 1 is adjusted to the focus distance $D_0$ of the first focal plane by liquid lens unit 12, the image capture unit 11 captures an image or photo at this focus distance $D_0$ and analyzes this image by image process unit 13. The tree P1 in the captured images under the focus distance $D_0$ is clear and the depth information of the tree P1 will be set as $D_0$. When adjusted to the focus distance $D_1$ of the second focal plane, the image capture unit 11 captures a image at focus distance $D_1$ and analyzes this image by image process unit 13. Since there are no clear objects at this focus distance $D_1$, no depth information is applicable. When adjusted to the focus distance $D_2$ of the third focal plane, the image capture unit 11 captures an image at focus distance $D_2$ and analyzes this image by image process unit 13. The human P2 in the captured image at focus distance $D_2$ is clear, so depth information of the human P2 will be set as D2. When adjusted to the focus distance $D_3$ of the fourth focal plane, the image capture units 11 captures an image or photo at this focus distance $D_3$ and analyzes this image by image process unit 13. Since there are no clear objects at this focal length, no depth information is applicable. When adjusted to the focus distance $D_4$ of the fifth focal plane, the image capture unit 11 captures an image or photo at this focus distance $D_4$ and analyzes this image by image process unit 13, the flower P3 in the captured images at focus distance $D_4$ is clear, so the depth information of the flower P3 will be set as $D_4$. When adjusted to the focus distance $D_5$ of the sixth focal plane the image capture unit 11 captures an image or photo at this focus distance $D_5$ and analyzes this image by image process unit 13. Since there are no clear objects at this captured image, no depth information is applicable.

Finally, please refer to FIG. 6B and step S306. Overlay the captured images with the clear object to form a clear photo having deep depth of field and depth information of the clear object. In this step, each image having the clear object is overlaid or some of the images having the clear object are overlaid to form a clear photo P having deep depth of field and depth information of the clear object. After overlaid of the instant embodiment, the tree P1 of the clear photo P having the depth information can have the first focus distance $D_0$, the human P2 of the clear photo P having the depth information can have the focus distance $D_2$ of the third focal plane, and the flower P3 of the clear photo P having the depth information can have the focus distance $D_4$ of the fifth focal plane. Notably in the instant embodiment, the subsequent images and depth information can be added or stored to a signal module for the overlaying process in order to obtain a clear photo P having deep depth of field and depth information. Furthermore, the image process unit 13 or signal processing module can be a computer or connected to a computer, so that the overlaying process and the determination of the object depth information can be processed by the computer. The image process unit 13, the signal processing module, and the control module 2 can also be embedded systems, which function similarly to a computer, can complete the overlaying process and the determination of the object depth information. Moreover, the focal-plane scanning of the camera module 1 is not limited only from far to near, but also from near to far.

When relatively small amount of subsequent images are captured, the distance between objects can be determined using interpolation. By interpolating small amount of images, the operation load of the image process unit 13, signal processing unit or control module 2 can be reduced, the overlaid efficiency to form a clear photo from multiple images with deep depth of field and depth information can be enhanced, and resolution is also enhanced. Furthermore, the image process unit and the control module 2 can be a computer that is responsible for completing the overlaying process and the determination of the object depth information. Notably in the second embodiment, after a series of narrow depth of field image groups are subsequently captured at different focus distance and within a short period of time, the image groups having the clear objects can be first overlaid, then the depth information of the objects in the images, via control module 2 or image process unit, are calculated after the overlaid process.

The second embodiment of the instant disclosure provides a method for capturing images, which has a camera module 1 with large aperture to create narrow depth of field. The camera module 1 captures a plurality of subsequent images that are overlaid thereafter to form a clear photo displaying deep depth of field and also having the corresponding depth information.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A method for capturing images and obtaining information of the images, comprising the steps of:
   providing a camera module, the camera module including an image capture unit, a liquid lens unit, and an image processing unit;
   capturing a clear image with the camera module;
   enlarging aperture of the camera module;
   actuating the liquid lens unit to adjust to different focal lengths;
   capturing a plurality of images at different focus distances when actuating the liquid lens unit to different focal lengths;
   analyzing depth information of objects in the clear image by the image process unit; and
   adding the depth information of the object to the clear image;
   wherein the camera module under the actuation of the liquid lens unit provides focal-plane scanning from far to near or from near to far;
   wherein when the focus distance of the camera module is adjusted to a first focal plane, the image capture unit first capturing the images at the first focal plane, the image process unit determines whether a correctly focused first clear portion exists at the first focal plane;
   if the first clear portion exists, the image process unit analyzes the depth information of the object of the first clear portion in the images of the first focal plane;
   wherein when the focus distance of the camera module is adjusted to a second focal plane from the first focal plane, the image capture unit first capturing the images at the second focal plane, the image process unit determines whether a correctly focused second clear portion exists at the second focal plane;
   if the second clear portion exists, the image process unit analyzes the depth information of the object of the second clear portion in the images of the second focal plane.

2. The method as recited in claim 1, wherein the image capture unit, the liquid lens unit, and the image processing unit are electrically connected to a control module.

3. The method as recited in claim 2, wherein the control module controls the image capture unit to capture the clear images, the enlargement of the aperture on the camera module, the focal length adjustments of the liquid lens unit, and the addition of the depth information of the object and the clear images.

4. A method for image capturing and obtaining information of the images, comprising the steps of:
   providing a camera module having large aperture to create narrow depth of field, and the camera module including an image capture unit, a liquid lens unit, and an image processing unit;
   actuating the liquid lens unit to adjust to different focal lengths and capturing a plurality of subsequent images at different focus distances;
   determining whether an object is clear in the plurality of captured subsequent images by the image processing unit and analyzing depth information of the clear object; and
   overlaying the subsequent images with the clear object to form a clear photo having deep depth of field and depth information of the clear object;
   wherein the camera module under the actuation of the liquid lens unit provides focal-plane scanning from far to near or from near to far;
   wherein when the focus distance of the camera module is adjusted to a first focal plane, the image capture unit first capturing the images at the first focal plane, the image process unit determines whether a correctly focused first clear portion exists at the first focal plane;
   if the first clear portion exists, the image process unit analyzes the depth information of the object of the first clear portion in the images of the first focal plane;
   wherein when the focus distance of the camera module is adjusted to a second focal plane from the first focal plane, the image capture unit first capturing the images at the second focal plane, the image process unit determines whether a correctly focused second clear portion exists at the second focal plane;
   if the second clear portion exists, the image process unit analyzes the depth information of the object of the second clear portion in the images of the second focal plane.

5. The method as recited in claim 4, wherein the image capture unit, the liquid lens unit, and the image processing unit are electrically connected to a control module.

6. The method as recited in claim 5, wherein the control module controls the focal length adjustments of the liquid lens unit, controls the image capture unit to capture the subsequent images, and the overlaying of the images having the clear object.

* * * * *